United States Patent
Scoffone et al.

(10) Patent No.: US 9,970,299 B2
(45) Date of Patent: May 15, 2018

(54) MIXING CHAMBERS FOR TURBINE WHEEL SPACE COOLING

(71) Applicant: General Electric Company, Schenectady, NY (US)

(72) Inventors: Matthew Peter Scoffone, Greenville, SC (US); Jason Edward Albert, Greenville, SC (US); Mitchell Merrill, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 373 days.

(21) Appl. No.: 14/855,490

(22) Filed: Sep. 16, 2015

(65) Prior Publication Data

US 2017/0074106 A1 Mar. 16, 2017

(51) Int. Cl.
*B67D 7/74* (2010.01)
*F01D 5/08* (2006.01)
*F02C 7/12* (2006.01)
*F02C 6/08* (2006.01)

(52) U.S. Cl.
CPC ............... *F01D 5/08* (2013.01); *F02C 7/12* (2013.01); *F02C 6/08* (2013.01); *F05D 2210/44* (2013.01); *F05D 2240/127* (2013.01)

(58) Field of Classification Search
CPC .. F01D 5/08; F05D 2210/44; F05D 2240/127; F02C 7/12; F02C 6/08; F16L 53/00; Y10T 137/0329; Y10T 137/206; Y10T 137/2087; Y10T 137/2093; Y10T 137/2104; Y10T 137/2109; Y10T 137/2115

USPC ... 137/896, 3, 803, 808, 809, 811, 812, 813, 137/338, 339, 340
See application file for complete search history.

(56) References Cited

U.S. PATENT DOCUMENTS

| | | | | |
|---|---|---|---|---|
| 1,924,038 A | * | 8/1933 | Herbsman | G05D 11/132 251/118 |
| 3,275,294 A | | 9/1966 | Allen et al. | |
| 3,868,967 A | * | 3/1975 | Harding | F16K 19/00 366/181.5 |

(Continued)

FOREIGN PATENT DOCUMENTS

| | | |
|---|---|---|
| EP | 1 965 052 A2 | 9/2008 |
| GB | 960 817 A | 6/1964 |
| GB | 2 235 551 A | 3/1991 |

OTHER PUBLICATIONS

Extended European Search Report and Opinion issued in connection with corresponding EP Application No. 16184518.5 dated Feb. 1, 2017.

*Primary Examiner* — Minh Le
(74) *Attorney, Agent, or Firm* — Eversheds Sutherland (US) LLP

(57) ABSTRACT

The present application provides a purge flow delivery system that may be used with a gas turbine engine. The purge flow delivery system may include a mixing chamber with a first sidewall, a second sidewall, and a cover plate, a first inlet tube positioned about the first sidewall, the first inlet tube configured to deliver a first fluid to the mixing chamber, a second inlet tube positioned about the second sidewall, the second inlet tube configured to deliver a second fluid to the mixing chamber, and a baffle plate attached to the cover plate and positioned to direct the first fluid at a first angle and the second fluid at a second angle.

20 Claims, 3 Drawing Sheets

(56) References Cited

U.S. PATENT DOCUMENTS

| | | | | |
|---|---|---|---|---|
| 4,498,786 A | * | 2/1985 | Ruscheweyh | B01F 5/0268 137/896 |
| 4,666,368 A | * | 5/1987 | Hook, Jr. | F01D 5/082 415/115 |
| 5,221,271 A | * | 6/1993 | Nicholson | A61M 39/04 604/539 |
| 5,352,087 A | | 10/1994 | Antonellis | |
| 5,358,374 A | | 10/1994 | Correia et al. | |
| 5,417,673 A | * | 5/1995 | Gordon | A61M 39/045 604/537 |
| 5,591,002 A | | 1/1997 | Cunha et al. | |
| 5,749,701 A | * | 5/1998 | Clarke | F01D 11/001 415/115 |
| 6,065,928 A | * | 5/2000 | Rieck, Jr. | F01D 5/189 415/115 |
| 6,077,034 A | | 6/2000 | Tomita et al. | |
| 6,398,485 B1 | | 6/2002 | Frosini et al. | |
| 8,079,803 B2 | * | 12/2011 | Takamura | F01D 5/081 415/115 |
| 8,562,285 B2 | * | 10/2013 | McCaffrey | F01D 5/081 415/115 |
| 8,926,267 B2 | * | 1/2015 | Lee | F01D 5/187 415/115 |
| 9,057,523 B2 | * | 6/2015 | Cunha | F23R 3/002 |
| 2009/0074589 A1 | | 3/2009 | Fang et al. | |
| 2010/0101673 A1 | * | 4/2010 | Cornwall | E03C 1/12 137/896 |
| 2011/0070077 A1 | * | 3/2011 | Steiger | F01D 5/081 415/208.1 |
| 2011/0189000 A1 | | 8/2011 | Vedhagiri et al. | |
| 2013/0004295 A1 | | 1/2013 | Naryzhny et al. | |
| 2015/0226085 A1 | * | 8/2015 | Spangler | F01D 25/12 60/806 |
| 2017/0044906 A1 | * | 2/2017 | Mongillo | F01D 5/188 |

\* cited by examiner

MIXING CHAMBERS FOR TURBINE WHEEL SPACE COOLING

TECHNICAL FIELD

The present application and resultant patent relate generally to turbine machinery and more particularly relate to mixing chambers for turbine wheel space cooling.

BACKGROUND OF THE INVENTION

Turbines may be used to generate power. A typical turbine may include a rotor associated with a number of wheels. The wheels may be spaced apart from each other along the length of the rotor and define a series of turbine stages. Turbine wheel spaces may be cavities or areas of a turbine located between the turbine rotor or wheels that support corresponding rows of turbine blades. The wheel spaces may be located radially inward of a mainstream flow of gas through adjacent turbine stages. Typically, the radially inward discs are heated by various effects, including conduction through the rotor blades, ingress of mainstream flow into the wheel space cavities, and windage heating within the wheel spaces.

Turbine wheel space temperatures may increase due to heating and may be related to turbine output, ambient temperature, and unit degradation or general condition. In some instances, wheel space temperatures may be higher than acceptable temperatures, causing operators to reduce turbine output to prevent excessive or high wheel space temperatures. To cool turbine wheel spaces, typically a purge system may be used to deliver a cooling flow to the wheel spaces and reduce the wheel space temperatures. However, due to size restrictions and turbine machinery structure, the cooling flow may not be delivered to the wheel spaces in an optimal manner.

SUMMARY OF THE INVENTION

The present application and the resultant patent thus provide a purge flow delivery system for use with a gas turbine engine. The purge flow delivery system may include a mixing chamber with a first sidewall, a second sidewall, and a cover plate, a first inlet tube positioned about the first sidewall, the first inlet tube configured to deliver a first fluid to the mixing chamber, a second inlet tube positioned about the second sidewall, the second inlet tube configured to deliver a second fluid to the mixing chamber, and a baffle plate attached to the cover plate and positioned to direct the first fluid at a first angle and the second fluid at a second angle The present application and the resultant patent further provide a method for cooling a wheel space of a gas turbine engine. The method may include flowing a first fluid into a mixing chamber at a first sidewall in a first direction, flowing a second fluid into the mixing chamber at a second sidewall in a second direction, redirecting the first fluid at a first angle via a baffle plate positioned within the mixing chamber, and redirecting the second fluid at a second angle opposite the first angle via the baffle plate.

The present application and the resultant patent further provide a purge flow delivery system for use with a gas turbine engine. The purge flow delivery system may include a mixing chamber with a first sidewall, a second sidewall opposite the first sidewall, and a cover plate, a first inlet tube positioned about the first sidewall, the first inlet tube configured to deliver a fluid to the mixing chamber, a second inlet tube positioned about the second sidewall, the second inlet tube configured to deliver the fluid to the mixing chamber, and a baffle plate attached to the cover plate and positioned to direct the first fluid at a first angle and the second fluid at a second angle opposite the first angle.

These and other features and improvements of the present application and the resultant patent will become apparent to one of ordinary skill in the art upon review of the following detailed description when taken in conjunction with the several drawings and the appended claims.

DETAILED DESCRIPTION

Certain embodiments of the disclosure include wheel space cooling systems that deliver cooling flow to wheel spaces of a turbine, such as a gas turbine engine. Embodiments of the disclosure may include purge flow delivery systems that cool wheel spaces via a purge flow or cooling flow. The cooling flow or purge flow may be extracted from a compressor in some embodiments. The wheel space cooling systems described herein may be positioned at any suitable stage and/or component of a turbine, such as at a second stage diaphragm. Certain embodiments of the disclosure include mixing chambers with baffle plates that prevent fluids entering the mixing chambers from opposing each other. In instances where fluids enter mixing chambers opposing each other, effectiveness of a cooling system may be reduced as flow from one inlet resists flow from another inlet. The baffle plates may interrupt the individual flows entering the mixing chambers, thereby reducing flow losses in the system, and may redirect the fluids so as to generate a favorable swirl of the fluids, resulting in increased mixing in the mixing chamber. Embodiments of the disclosure may prevent two incoming fluids from directly impinging each other, thereby decreasing pressure losses and increasing efficiency of a cooling flow circuit. Certain embodiments may create a favorable flow pattern in a mixing chamber, such that cooling air or fluid flows more readily into an exit hole that may feed into a wheel space, thereby improving cooling efficiency. Embodiments of the disclosure may therefore cool wheel spaces and/or other components of a rotor in a compact axial space and increase part life and efficiency.

Figure 1:
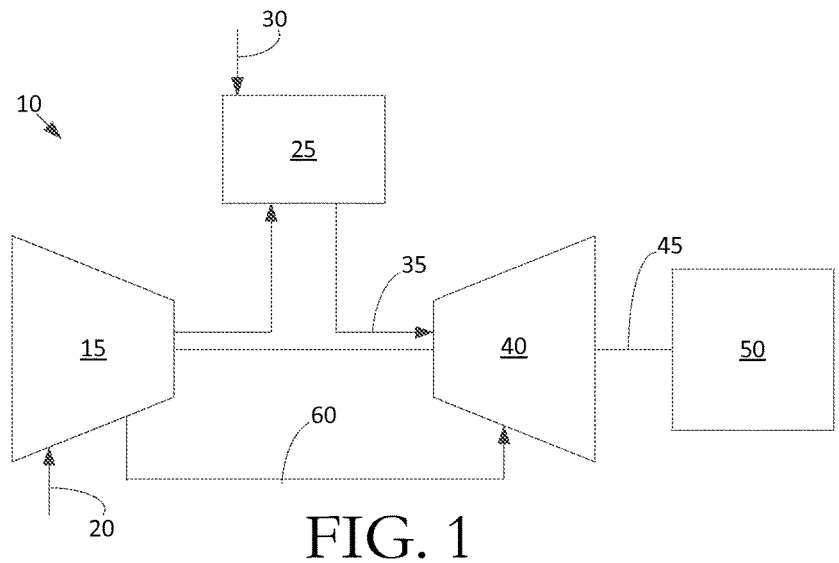
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 arranged in a circumferential array or otherwise. The flow of combustion gases 35 is in turn delivered to a turbine 40. The turbine 40 may be axially aligned with the compressor 15 on a single shaft. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Most of the compressed air provided by the compressor 15 may be supplied to the turbine combustors 25, but some of the compressed air may be extracted for other uses. For example, cooling air may be extracted from the compressor 15 at one or more extraction ports and supplied via lines, such as line 60, to selected areas of the turbine 40 and ultimately to wheel spaces within the turbine 40 via inlet ports, such as holes in the turbine casing.

Figure 2:
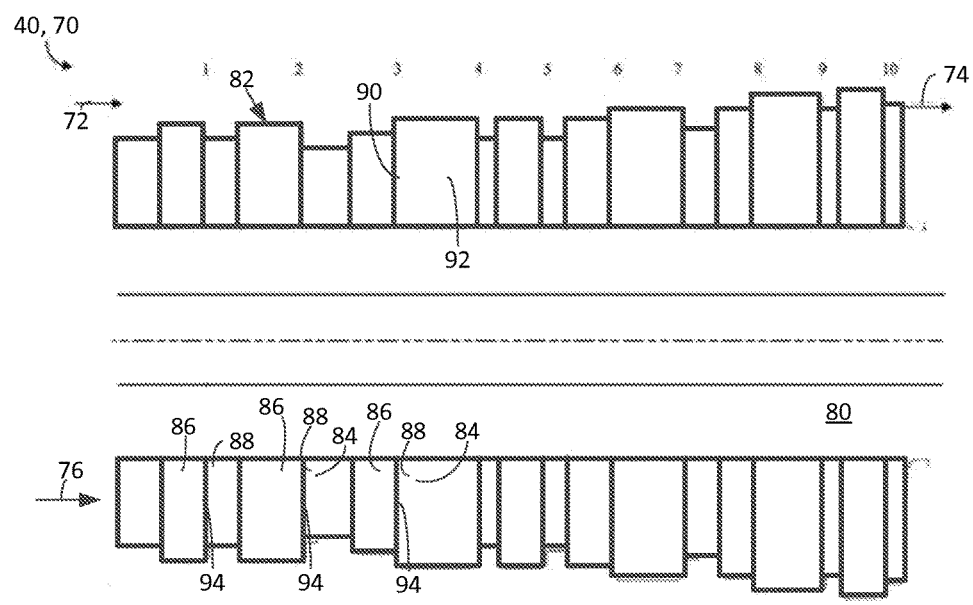
FIG. 2 is a schematic side view of a turbine component of the gas turbine engine of FIG. 1.

FIG. 2 is a side cross-sectional view of a section 70 of the turbine 40 of FIG. 1. The section 70 may include a second stage of the turbine 70. The section 70 may include an entrance 72 and an exit 74. The entrance 70 may be in communication with the flow of combustion gases 35 from the combustors 25. The exit 74 may be in communication with an exhaust flow or other section of the gas turbine engine 10. A flow path 76 may extend through the section 70 from the entrance 72 to the exit 74.

A rotor 80 of the turbine 40 may extend along the flow path 76 within each section. A number of stages 82 also may be defined along the flow path 76. Each stage 82 may include a wheel 84 associated with the rotor 80. The wheels 84 may be spaced apart from each other along the rotor 80 with a stationary part 86. A wheel space 88 may be defined between each pair of the wheels 84. The wheels 84 may extend outward from the rotor 80. A bucket 90 may be attached to each of the wheels 84 for rotation therewith. Each stage 82 may also include a stationary nozzle 92 positioned adjacent to each bucket 90. Any number of stages 92 may be used herein. Other configurations and other components also may be used herein.

The turbine 40 also may include a wheel space cooling system 94. The wheel space cooling system 94 may be configured to cool one or more of the wheel spaces 88. In some embodiments, the wheel space cooling system 94 may flow cooling air extracted from the compressor 15 to cool or purge the wheel spaces 88. The wheel space cooling system 94 may receive cooling flow from the compressor 15 via the line 60.

Figure 3:
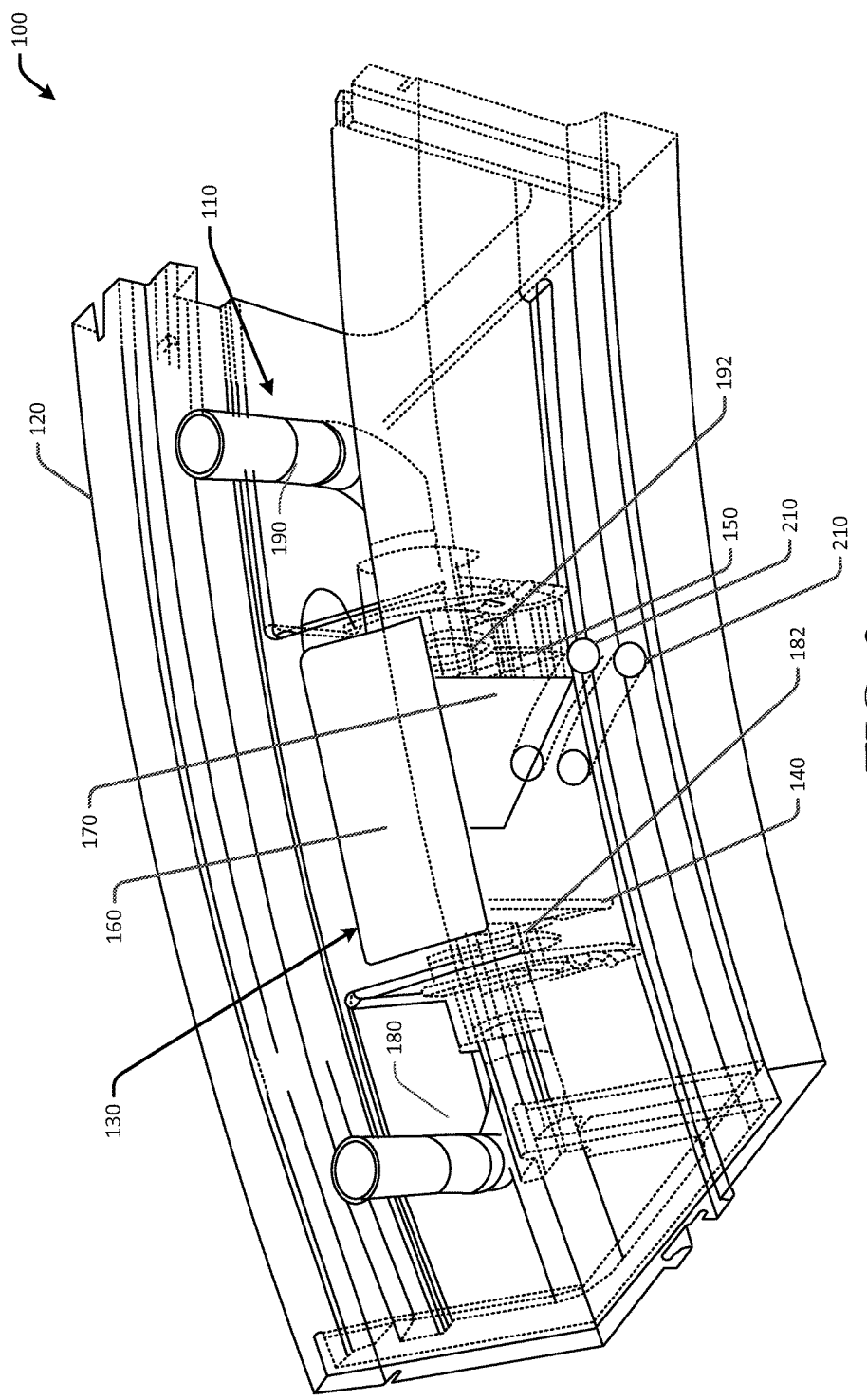
FIG. 3 is a schematic perspective view of a wheel space cooling system in accordance with one or more embodiments of the disclosure.

Referring now to FIG. 3, a wheel space cooling system 100 in accordance with one or more embodiments of the disclosure is depicted in perspective view. The wheel space cooling system 100 may be a purge flow delivery system. The wheel space cooling system 100 may be positioned at a wheel space 110 of a rotor 120, for example, at a second stage diaphragm of a gas turbine engine. The wheel space cooling system 100 may be configured to deliver cooling flow, purge flow, or another fluid to the wheel space 110. The wheel space cooling system 100 may include a mixing chamber 130 with one or more inlets and one or more exits. The inlets or outlets may be formed as holes. The mixing chamber 130 may have a box-like shape and may be partially formed of a solid machined material in some embodiments. For example, in FIG. 3, the mixing chamber 130 may include a first sidewall 140 and a second sidewall 150. The first sidewall 140 and the second sidewall 150 may be axially aligned with, and in some instances parallel to a central axis of, the rotor 120. The first sidewall 140 may be parallel to the second sidewall 150, and may form a sidewall of the mixing chamber 130 that is opposite the second sidewall 150. A third sidewall and a fourth sidewall positioned in between the first sidewall 140 and the second sidewall 150 may form a lower portion of the mixing chamber 130. The four sidewalls of the mixing chamber 130, along with a "bottom" wall in some embodiments, may be formed from a solid machined material ("bottom," "top," and "side" are used herein only to describe relative positioning and not absolute positions). The mixing chamber 130 may have a depth that may be defined by a height of one or more of the sidewalls in some embodiments. In other embodiments, one or more of the sidewalls of the mixing chamber 130 may be angled with respect to each other.

The mixing chamber 130 may include a cover plate 160. The cover plate 160 may form a "top" of the mixing chamber 130. The cover plate 160 may be welded to one or more of the sidewalls of the mixing chamber 130 so as to form a pressurized cavity within the mixing chamber 130. In other embodiments, the cover plate 160 may be removably attached to other portions of the mixing chamber 130.

A baffle plate 170 may be attached to the cover plate 160. The baffle plate 170 may be fixed with respect to the cover plate 160. In some embodiments, the baffle plate 170 may be welded to the cover plate 160. The baffle plate 170 may be fixed at an angle with respect to the cover plate 160. The baffle plate 170 may be attached to the cover plate 160 at or near a center of the cover plate 160. In other embodiments, the baffle plate 170 may be configured to rotate from a first fixed position to a second fixed position with respect to the cover plate 160.

A first inlet tube 180 may deliver a first fluid to the mixing chamber 130. The first inlet tube 180 may have a first diameter 182 at the first sidewall 140. The first inlet tube 180 may deliver the first fluid to the mixing chamber 130 through a hole in the first sidewall 140. A second inlet tube 190 may deliver a second fluid to the mixing chamber 130. The second inlet tube 190 may have a second diameter 192 at the second sidewall 150. The second inlet tube 190 may deliver the second fluid to the mixing chamber 130 through a hole in the second sidewall 150. The first diameter 182 may be the same or different than the second diameter 192. The first fluid may be the same or different than the second fluid. Either or both the first fluid or the second fluid may be purge flow or cooling flow, such as gas or liquid. The mixing chamber 130 may include additional or fewer components. Other components and other configurations may be used herein.

Fluid, such as cooling air or cooling fluid, that is in the mixing chamber 130 may exit the mixing chamber 130 via one or more exit hole(s) 210. The exit hole(s) 210 may exit to the wheel space. The exit hole(s) 210 may exit forward of a diaphragm, aft of a diaphragm, or radially inward. The exit hole(s) 210 may have a central axis that is substantially parallel to or aligned with an angle of the baffle plate 170. The flow that enters the mixing chamber 130 may exit the mixing chamber 130, and the baffle plate 170 may assist in directing flow inside the mixing chamber 130 into the exit hole(s) 210, which may result in reduced pressure losses in a cooling flow circuit. The exit hole(s) 210 may be positioned with respect to the baffle plate 170. For example, the exit hole(s) 210 may be positioned in the converging (acute) region defined by one end of the baffle plate 170. Such positioning may force or assist the flow from the mixing chamber 130 into the exit hole(s) 210 allowing for decreased pressure losses and/or decreased flow separation in the exit hole(s) 210.

Figure 4:
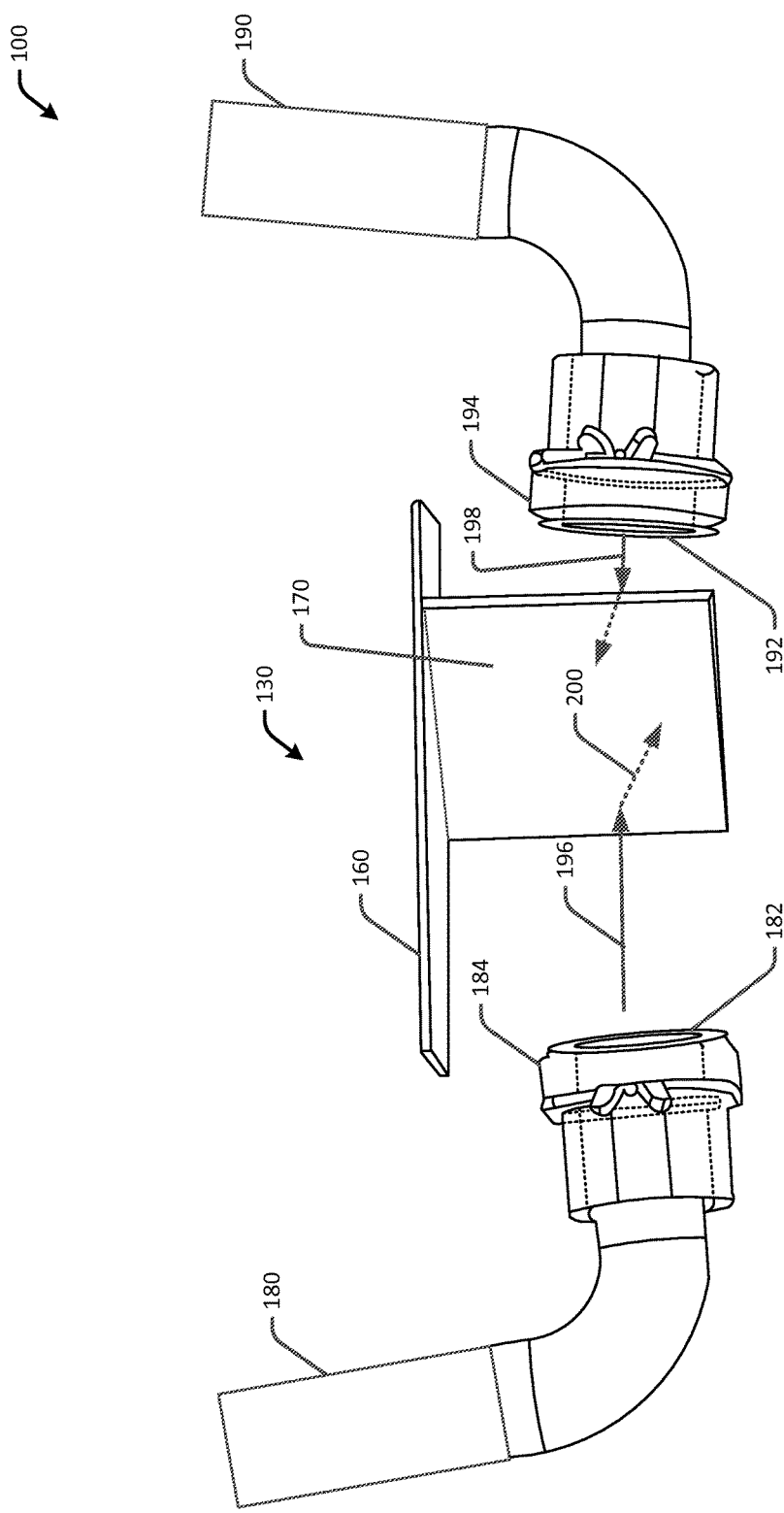
FIG. 4 is a schematic detailed view of portions of the wheel space cooling system of FIG. 3 in accordance with one or more embodiments of the disclosure.

Referring to FIG. 4, certain components of the wheel space cooling system 100 are illustrated in detailed view. The first inlet tube 180 may include a first fluid direction portion 184 that directs fluid exiting the first inlet tube 180 and entering the mixing chamber 130 in a first inlet direction 196. The second inlet tube 190 may include a second fluid direction portion 194 that directs fluid exiting the second inlet tube 190 in a second inlet direction 198. The second inlet direction 198 may be opposite the first inlet direction 196, or in some embodiments, the second inlet direction 198 may be angled (e.g., obtuse or acute) with respect to the first inlet direction 196. In some embodiments, the first inlet tube 180 and the second inlet tube 190 may be positioned directly opposite each other, such that the first inlet direction 196 is opposite the second inlet direction 198. As a result, the first fluid exiting the first inlet tube 180 may be on a path to directly oppose the second fluid exiting the second inlet tube 190.

The baffle plate 170 may have a width that is greater than or equal to the first diameter 182 and/or the second diameter 192. The baffle plate 170 may have a height that is less than or equal to a depth of the mixing chamber 130. In some embodiments, the baffle plate 170 may have a height greater than a depth of the mixing chamber 130 in order to engage into a slot at a bottom of the mixing chamber for structural stability. For example, the baffle plate 170 may have a tab that mates with a groove at a bottom of the mixing chamber so that it is supported at both ends instead of being cantilevered from one end. This may help prevent the baffle plate 170 from being liberated in the event of structural failure. In some embodiments, the baffle plate 170 may be planar or substantially planar and may be solid (e.g., may not have holes). The baffle plate 170 may be rectangular.

The baffle plate 170 may be positioned within the mixing chamber 130 to interrupt the first fluid flow and the second fluid flow. The baffle plate 170 may redirect the fluid entering the mixing chamber 130. For example, the first fluid from the first inlet tube 180 may enter the mixing chamber 130 at a first angle, contact the baffle plate 170, and may be redirected to a second direction 200 that may be determined based on the angle and/or position of the baffle plate 170. Similarly, the second fluid from the second inlet tube 190 may enter the mixing chamber 130 at a second angle, contact an opposite surface of the baffle plate 170, and may be redirected to a second direction along the baffle plate surface. As a result, rather than intersecting, the first fluid and the second fluid may be directed in opposite angled directions. The baffle plate 170 and angle of the baffle plate 170 with respect to the first inlet direction 196 and the second inlet direction 198 may not only avoid loss due to opposing fluid flows, but may also enhance mixing within the mixing chamber 130 due to a swirl of the first fluid and the second fluid generated by the redirection of the fluid flows. The mixed fluid may exit the mixing chamber 130 and cool the wheel space 120. Because of the increased mixing, a reduced amount of flows may be input to generate a cooling effect. In addition, the baffle plate 170 may prevent incoming fluids from directly impinging each other, thereby decreasing pressure losses and increasing efficiency of a cooling flow circuit. Further, the baffle plate 170 may assist in guiding cooling air or fluid into exit holes that may feed into a wheel space, thereby improving cooling efficiency.

In some embodiments, such as the embodiment illustrated in FIG. 4, the baffle plate 170 may be positioned to direct the first fluid at a first angle in the first inlet direction 196 and the second fluid at a second angle in the second inlet direction 198. The first angle may be equal and/or opposite to the second angle. The first inlet direction 196 may be opposite the second inlet direction 198, such that the first fluid and the second fluid are directed at a same angle in opposite directions within the mixing chamber 130.

A method of using the wheel space cooling system 100 may include flowing a first fluid into a mixing chamber at a first sidewall in a first direction, flowing a second fluid into the mixing chamber at a second sidewall in a second direction, redirecting the first fluid at a first angle via a baffle plate positioned within the mixing chamber, and redirecting the second fluid at a second angle opposite the first angle via the baffle plate.

The wheel space cooling systems described herein thus reduce the supply pressure needed to drive the cooling flow to the wheel space. By reducing supply pressure, leakage elsewhere in the cooling system can be reduced, which may reduce cooling flow. The cooling systems described herein may reduce flow losses by reducing or removing opposing fluid flows and related resistance in mixing chambers, while increasing mixing within the mixing chambers. Further, less cooling flow may be required in the mixing chamber for a desired cooling flow exit. Losses within the mixing chamber are reduced and thus allow for less cooling flow to be fed into the mixing chamber for a certain amount of cooling flow to exit. Increasing mixing and reducing wheel space temperatures may allow the use of a lower cost material for the rotor and/or other components as described herein. Similarly, higher operating temperatures may be used with an associated higher power output and efficiency.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A purge flow delivery system comprising:
   a mixing chamber comprising a first sidewall, a second sidewall, and a cover plate;
   a first inlet tube positioned about the first sidewall, the first inlet tube configured to deliver a first fluid to the mixing chamber;
   a second inlet tube positioned about the second sidewall, the second inlet tube configured to deliver a second fluid to the mixing chamber; and
   a baffle plate attached to the cover plate and positioned to direct the first fluid in a first direction at a first angle with respect to a first surface of the baffle plate and the second fluid in a second direction at a second angle with respect to a second surface of the baffle plate; and
   an exit hole configured to direct fluid from the mixing chamber to a wheel space, the exit hole positioned with a central axis substantially aligned with the first direction.

2. The purge flow delivery system of claim 1, wherein:
   the first inlet tube delivers the first fluid at a first inlet direction; and the second inlet tube delivers the second fluid at a second inlet direction that is opposite the first inlet direction.

3. The purge flow delivery system of claim 2, wherein: the first angle is equal to the second angle such that the first fluid and the second fluid are directed at a same angle in opposite directions within the mixing chamber.

4. The purge flow delivery system of claim 1, wherein the first angle is equal to the second angle.

5. The purge flow delivery system of claim 1, wherein the first inlet tube has a first diameter and the second inlet tube has a second diameter; and
wherein a width of the baffle plate is greater than the first diameter and the second diameter.

6. The purge flow delivery system of claim 1, wherein the mixing chamber has a depth, and the baffle plate has a height that is less than the depth.

7. The purge flow delivery system of claim 1, wherein the mixing chamber is positioned at a second stage or a third stage diaphragm of a turbine.

8. The purge flow delivery system of claim 1, wherein the cover plate is removable from the mixing chamber.

9. The purge flow delivery system of claim 1, wherein the baffle plate is positioned at an angle with respect to a first inlet direction of the first fluid and a second inlet direction of the second fluid.

10. The purge flow delivery system of claim 1, further comprising a plurality of exit holes extending from the mixing chamber to a wheel space of a turbine.

11. The purge flow delivery system of claim 10, wherein at least one of the plurality of exit holes is positioned at a converging region adjacent to an end of the baffle plate, and configured to deliver cooling flow forward of a diaphragm.

12. The purge flow delivery system of claim 1, wherein the first fluid is different than the second fluid, and the baffle plate is positioned to generate a swirl of the first fluid and the second fluid in the mixing chamber.

13. The purge flow delivery system of claim 1, wherein the mixing chamber comprises a solid machined or cast box-like structure.

14. The purge flow delivery system of claim 1, wherein the baffle plate is positioned to interrupt the flow of the first fluid and the second fluid and to prevent the first fluid from opposing the second fluid.

15. A method for cooling a wheel space of a turbine comprising:
flowing a first fluid into a mixing chamber at a first sidewall of the mixing chamber in a first direction;
flowing a second fluid into the mixing chamber at a second sidewall of the mixing chamber in a second direction;
redirecting the first fluid via a planar baffle plate positioned within the mixing chamber in a first direction at a first angle with respect to a first surface of the planar baffle;
redirecting the second fluid via the planar baffle plate in a second direction at a second angle with respect to a second surface of the planar baffle; and
flowing a mixture of the first fluid and the second fluid to the wheel space via an exit hole configured to direct fluid from the mixing chamber to the wheel space, wherein the exit hole is positioned with a central axis substantially aligned with the first direction.

16. A purge flow delivery system for use with a gas turbine engine comprising: a mixing chamber comprising a first sidewall, a second sidewall opposite the first sidewall, and a cover plate;
a first inlet tube positioned about the first sidewall, the first inlet tube configured to deliver a fluid to the mixing chamber;
a second inlet tube positioned about the second sidewall, the second inlet tube configured to deliver the fluid to the mixing chamber;
a baffle plate attached to the cover plate and positioned to direct the first fluid in a first direction at a first angle with respect to a first surface of the baffle plate and the second fluid in a second direction at a second angle with respect to a second surface of the baffle plate opposite the first direction; and
an exit hole configured to direct fluid from the mixing chamber to a wheel space, the exit hole positioned with a central axis substantially aligned with the first direction.

17. The purge flow delivery system of claim 16, wherein the baffle plate comprises a width greater than a diameter of the first inlet tube.

18. The purge flow delivery system of claim 16, wherein the baffle plate comprises a height less than a depth of the mixing chamber.

19. The purge flow delivery system of claim 16, wherein the baffle plate is substantially planar.

20. The purge flow delivery system of claim 16, wherein the baffle plate is solid and planar.

* * * * *